United States Patent [19]

Stearn

[11] 4,324,141
[45] Apr. 13, 1982

[54] ULTRASONIC MEASUREMENT OF THICKNESS

[75] Inventor: Richard J. Stearn, Milton Keynes, England

[73] Assignee: Balteau Sonatest Limited, Buckinghamshire, England

[21] Appl. No.: 110,557

[22] Filed: Jan. 8, 1980

[30] Foreign Application Priority Data

Jan. 8, 1979 [GB] United Kingdom ............... 00596/79

[51] Int. Cl.³ ............................................. G01N 29/00
[52] U.S. Cl. ..................................... 73/627; 73/1 DV
[58] Field of Search ...................... 73/627, 597, 1 DV

[56] References Cited

U.S. PATENT DOCUMENTS 3,624,712 11/1971 Weighart .............................. 73/627
3,918,296 11/1975 Kitada .................................. 73/627
4,182,155 1/1980 Fowler ............................. 73/1 DV

FOREIGN PATENT DOCUMENTS 2422439 11/1975 Fed. Rep. of Germany ........ 73/627

Primary Examiner—Anthony V. Ciarlante
Attorney, Agent, or Firm—Young & Thompson

[57] ABSTRACT

An ultrasonic thickness meter provides one or both of two improved operational facilities. The first enables the meter probe to be zeroed at will to allow for the acoustic transit time of the stand-off material of the probe. The second enables the operator at the flick of a switch to display the difference 'plus or minus' between the thickness of a workpiece being measured and that of a set standard. The meter includes means to duplicate the acoustic transit time of a zero block or standard block electronically as a first time value signal and to set up a second time-value signal representing the time from excitation of the transmitter crystal to receipt of the first return echo from the far side of the zero block or standard block. These time-value signals are combined under the control of manually operated switches to zero the probe or offset the probe to the set standard.

16 Claims, 4 Drawing Figures

ULTRASONIC MEASUREMENT OF THICKNESS

BACKGROUND OF THE INVENTION

This invention relates to apparatus for and methods of measuring the thickness of materials by the use of ultrasonic techniques.

It is the conventional practice, when making ultrasonic measurements of the thickness of materials in the range from 1 mm upwards, to use a dual probe where the transmitter and receiver crystals of piezoelectric material are separated, and where each of the transmitter and receiver elements has an acoustic "stand-off" between its piezoelectric crystal and the actual working surface of the probe. When carrying out measurements at room temperature it is usual to use plastics materials for the stand-off, while for measurements at higher temperatures one can use a polyamide material, quartz or certain glass materials. Ultrasonic probes for thickness measurement may be required to function at different frequencies, and both the size and shape of the probes will depend inter alia upon the frequency of excitation and the particular application for which the probe is to be used. For example, in the case of a probe designed to measure the thickness of high temperature materials, it may be necessary to provide a relatively long stand-off in order to ensure that there is sufficient thermal insulation between the piezoelectric crystal material and the working surface of the probe which contacts the material under test, since most piezoelectric crystal materials have a Curie point of less than 300° C.

In making a measurement of the thickness of a piece of material, because the ultrasonic pulses have to traverse both the stand-off and the material under test, it is necessary to subtract from the time interval between the excitation of the transmitter crystal and the reception of the first echo from the far side of the material under test a time period which is equal to the transmission time of the ultrasonic pulses through the material of the stand-off. This subtraction results in a time period which is representative of the actual thickness of the material under test; this elapsed time figure can readily be converted into a thickness figure.

One conventional method of performing this subtraction is by including in the instrument a monostable circuit which is triggered at the instant that the transmitter crystal is excited and which has a monostable period which is equal to the time taken by the ultrasonic pulses to traverse the material of the stand-off. One can make the monostable time period fully adjustable by providing a multi-turn control knob. Alternatively, and more usually, the monostable time period can be preset by the operator by the use of a control device which is adjustable by means of a screwdriver. The latter type of adjustment normally only provides a "fine trim" about a predetermined value which is set by the internal components of the instrument.

Measuring instruments which incorporate such means of adjustment can, as a consequence, only use probes which have stand-off times which fall within a fairly narrow range. Particularly where a screwdriver "fine" adjustment is provided one is not normally able to use more than one or two types of probe with the measuring instrument. If a zero control is fitted, the control can be made to cover a wide range with adequate resolution by making the control a multi-turn adjustment element. This does enable one to use a wider range of probes with the measuring equipment, but such an adjustment places much more onus on the operator to make the right settings. The wider the range of adjustment permitted by the control means, the larger is the possible error if the adjustment setting is incorrect.

In certain known measuring instruments a time representative of the acoustic stand-off time is preset inside the instrument and there is no provision for the operator to make a zero adjustment of the probe. However, a preset fixed delay time of this nature is only able to give moderate accuracy for a limited period because in practice the face of the probe is normally subject to wear as it moves on the workpiece surface, thus causing a change in the actual acoustic transit time through the stand-off material. Furthermore, in the case of high temperature measurements, the temperature of the stand-off material will increase as a series of measurements are carried out, and this will produce a change in the ultrasonic velocity through the stand-off material and hence a change in the acoustic delay time. An instrument with a preset delay time can obviously not cater for such variations, and even with the provision of a manual zero adjustment control it is extremely difficult to make any reliable compensation for such temperature changes, primarily because by the time that the zero control has been reset the temperature of the stand-off material will probably have decreased, because the probe normally has to be removed from the workpiece during the adjustment process.

In some known instruments which provide for manual adjustment of the stand-off delay time it is possible to "offset" the instrument so that the effective readings start at some thickness other than zero, provided that the range covered by the zero control is adequate. For example, one might adjust the zero so that readings displayed on the meter of the instrument start from one inch and go upwards, so that a 1½ inch workpiece would then read 0.5 on the meter scale instead of 1.5. Hoever, such an arrangement has a number of disadvantages. In many cases it would not then be possible to take any readings below a certain minimum thickness and the arrangement is much more subject to operator error due to inability to make the proper adjustment or failure to interpret the readings correctly.

SUMMARY OF THE INVENTION

It is an object of the present invention to provide an improved method of and apparatus for the measurement of the thickness of workpieces or materials under test which avoids, to a substantial extent, the disadvantages of the known arrangements outlined above. The especial advantages of the method and apparatus of the present invention will be referred to in more detail later.

In accordance with the invention there is provided a method of measuring the thickness of a test piece using an ultrasonic probe comprising ultrasonic pulse transmitting and receiving means mounted on an acoustic stand-off, the method comprising placing the probe on a block which has a determined pulse transit time, duplicating said transit time as a first time-value signal, detecting the first return echo received by the pulse receiving means from the remote face of the block, setting up a second time-value signal representative of the time period from the transmission of a pulse by said pulse transmitting means to the receipt of the first such return echo arising from said pulse, and using said first and second time-value signals under the control of manual control means to adjust the probe output values for the acoustic delay time of the stand-off material or to an offset value dependent on the transit time of the block.

Also in accordance with the invention there is provided apparatus for measuring the thickness of materials comprising an ultrasonic probe comprising ultrasonic pulse transmitting and receiving means mounted on an acoustic stand-off, presettable means to duplicate the transit time of such pulses through a block on which the probe may be placed and to produce a first time-value signal representative thereof, means to generate a second time-value signal representative of the time period from the transmission of a pulse by said pulse transmitting means to the receipt of the first return echo from the remote face of said block, and manual control means operative to use said time-value signals to adjust the probe output values for the acoustic delay time of the stand-off material or to an offset value dependent on the transit time of the block.

The method of thickness measurement and the apparatus for carrying out the method of the present invention involve manual control which in the preferred embodiment can be used in one of two alternative modes, as desired. According to the first mode, the probe is placed on a "zero block" which has a known acoustic transit time, this transit time is duplicated electronically inside the instrument, and the subsequent depression of a zero push-button or switch causes the instrument automatically to adjust electronically for the acoustic delay resulting from the stand-off material.

According to the second mode of operation, the measuring apparatus can be used to make differential measurements of thickness by adjusting the zero of the measuring instrument not to the acoustic zero of the probe but to the first return echo from a "standard" test block.

BRIEF DESCRIPTION OF THE DRAWINGS

In order that the invention may be fully understood, a preferred embodiment of measuring apparatus in accordance with the invention will now be described by way of example and with reference to the accompanying drawings, in which:

FIG. 1a shows a probe for operation according to the mode shown in FIG. 1;

DESCRIPTION OF THE PREFERRED EMBODIMENT

Figure 1:
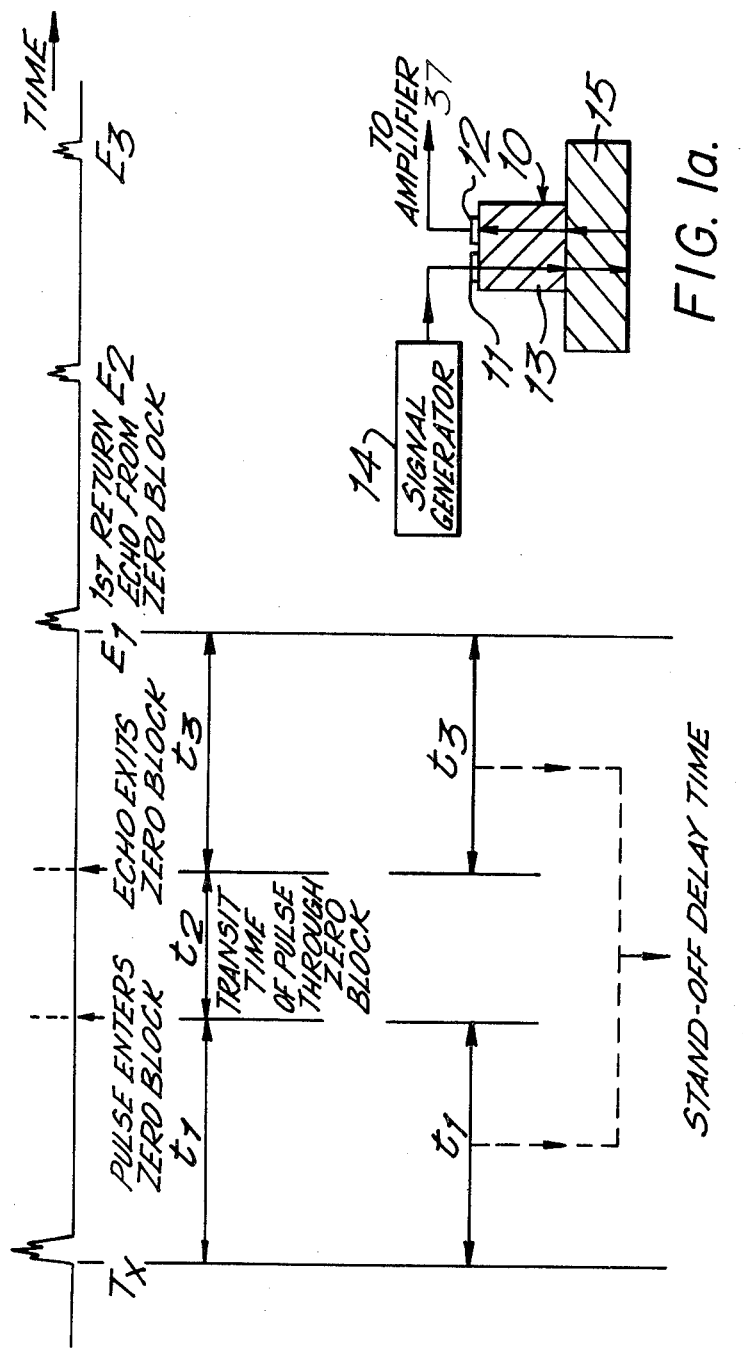
FIG. 1 is a schematic timing diagram illustrating the first, i.e. zeroing, mode of operation of the apparatus.

Reference is made first to FIGS. 1 and 1a which illustrate the zeroing mode of operation. The dual probe indicated schematically at 10 in FIG. 1a comprises a piezoelectric transmitter crystal 11 and a receiver crystal 12 mounted on a stand-off 13. The transmitter crystal 11 is connected to a signal generator 14. In order to adjust the acoustic zero of the probe, i.e. in order to compensate for the delay of the stand-off material, the probe 10 is placed on a zero block 15, for example a 10 mm block of steel. The zero block 15 should be flat and have a reasonable surface for coupling to the probe 10.

The thickness of the block 15 and the ultrasonic velocity in the material of the zero block must be interrelated in order to provide a known pulse transit time through the zero block which can be duplicated electronically. As FIG. 1 shows, after a time period $t_1$ following the excitation $T_x$ of the transmitter crystal 11 an ultrasonic pulse leaves the face of the probe, i.e. of the stand-off 13, and enters the zero block 15. After a further time period $t_2$ the pulse will have traversed and zero block and the first return echo will re-enter the stand-off 13. After a further time period $t_3$ the receiver crystal 12 picks up the first return echo $E_1$ from the remote face of the zero block. Successive return echos $E_2, E_3$ etc. of decreasing amplitude follow.

The depression of a zero push-button activates the circuitry inside the instrument, and when the push-button is released the following process takes place. The instrument incorporates an approximation circuit, as will be described in more detail later in relation to FIG. 3, which makes successive approximations of the position in time of the first return echo ($E_1$) received from the bottom of the zero block 15. The approximation circuit is triggered from the rear edge of a preset monostable which duplicates the zero block transit time, and the electronic circuitry thus produces the time period $t_1 + t_2 + t_3$ which is equal to the transit time $t_2$ through the zero block plus the acoustic delay time $t_1 + t_3$ in the stand-off. The approximation circuit approximates this time period $t_1 + t_2 + t_3$ to within about 3 nanoseconds. The zero block transit time $t_2$ which is known from the block thickness and the ultrasonic velocity in the block material is duplicated electronically by the aforesaid preset monostable. When the approximation process for the period $t_1 + t_2 + t_3$ is completed, the preset monostable which duplicates the zero block transit time $t_2$ is by-passed in order effectively to subtract this time period $t_2$ from the total time period $t_1 + t_2 + t_3$, thereby setting an internal time period $t_1 + t_3$ which is equal to the acoustic delay time through the stand-off material, i.e. only the approximated stand-off delay time remains in circuit. The timing circuitry is triggered in coincidence with the pulse applied to the transmitter crystal 11, so that the internal time datum which is produced corresponds to the instant at which the pulse leaves the probe and enters the workpiece under test, i.e. it corresponds with the probe zero ($P_Z$). The approximation circuit is digitally controlled so that the stand-off delay time $t_1 + t_3$ may be reproduced, i.e. "remembered", after the probe is removed from the zero block.

The push-button probe zeroing process has a number of important advantages. It is speedy, and the results are not dependent upon the skill of an operator in adjusting a control mechanism. The zeroing process covers a wide range, thereby enabling the use of a large number of different probe sizes. In the case of a high temperature measurement, the probe has less time to cool down while the zero adjustment is being made, and because the adjustment is quick and easy the operator can make repeated zero adjustments in between carrying out actual measurements, the repeated adjustment meaning that more accurate results can be achieved. An operator who is making high temperature measurements is usually wearing asbestos gloves, which means that a push-button zeroing procedure is much simpler than adjusting a rotatable control knob. Furthermore, in the case when measurements are made on rough surfaces, such as castings, the probe surface becomes more quickly worn, thereby altering the effective value of the acoustic delay of the stand-off. The ability to readjust the probe zero quickly at short intervals immediately provides improved accuracy under these conditions.

Although reference was made above to the zero block 15 having a flat smooth surface, occasions may arise when a zero block having a curved surface is desirable. When making thickness measurements of sections of pipe for example, where the probe has to be held against a curved surface, it is the conventional practice for zero adjustments to be made on flat surfaces on the assumption that corresponding results will be achieved when the probe is transferred to a curved workpiece surface. However, because of the way that an ultrasonic pulse passes from the probe to the workpiece, errors may arise in the case of a curved surface. The use of a zero block with an appropriately curved surface means that by using the push-button zeroing adjustment of the present invention such errors can be totally eliminated.

Figure 2:
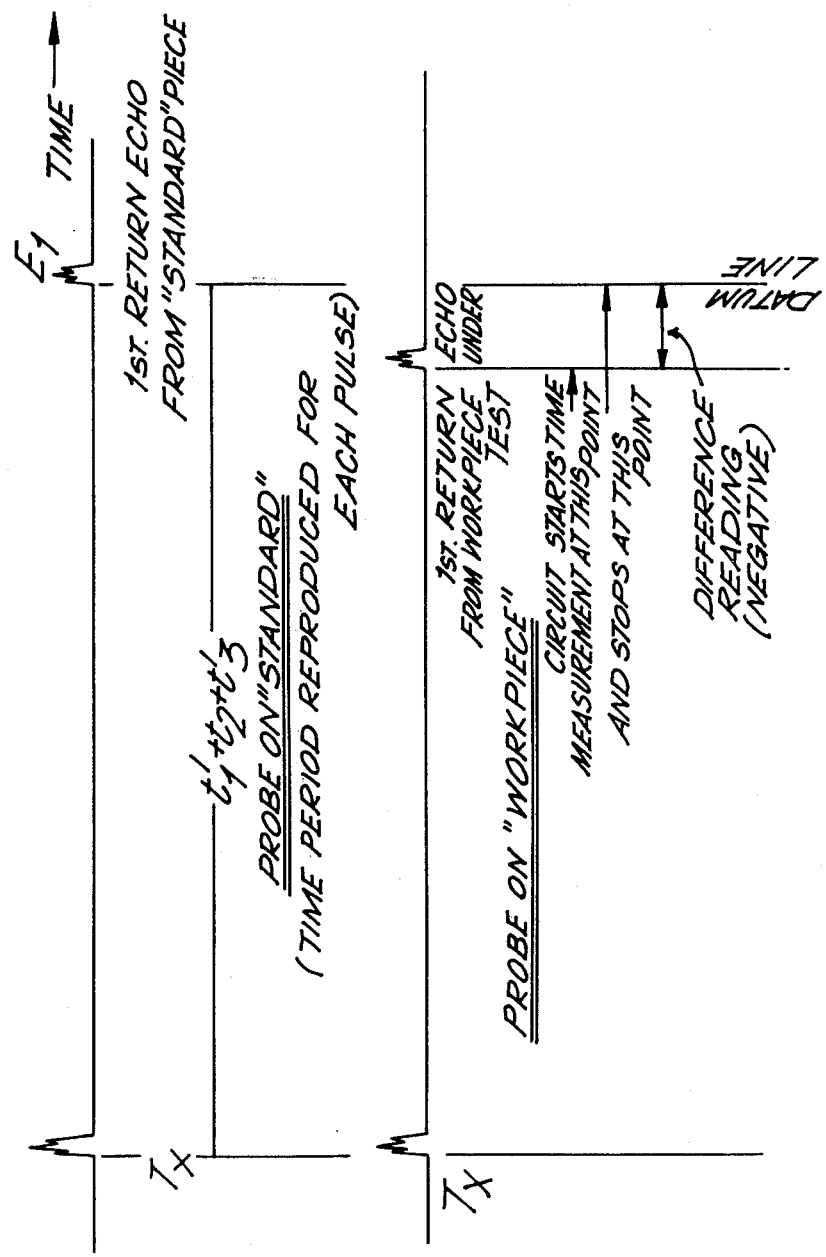
FIG. 2 is a similar schematic timing diagram illustrating the second, i.e. offset, mode of operation of the apparatus; and, FIG. 3 is a block schematic diagram of thickness measuring apparatus in accordance with the present invention which can be operated in either one of the aforesaid two modes.

FIG. 2 illustrates the principle of the second mode of operation in accordance with the present invention whereby the instrument can be used to make differential measurements of thickness by adjusting the zero of the instrument to the first return echo from a "standard" piece. In essence, this offset mode of operation simply requires that the transit time $t_2$ should not be subtracted at the conclusion of the approximation process. When the probe is placed on the "standard" piece, the internal preset monostable which is used in the zeroing process to duplicate the transit time $t_2$ through the zero block 15, together with the approximation circuits, produce a time period $t_1' + t_2 + t_3'$ representative of the time between the excitation $T_x$ of the transmitter crystal 11 and the first return echo $E_1$ at the receiver crystal 12. With the offset mode of operation the circuitry "remembers" this time period $t_1' + t_2 + t_3'$, reproducing it each time that the probe produces a pulse, so that measurements of actual workpiece thickness are given in relation to this memorised time and not to the probe zero time. When the probe is subsequently placed on a workpiece to be examined, the circuit either starts measuring time on receipt of the first return echo from the workpiece and stops measuring at the memorised standard time $t_1' + t_2 + t_3'$ or, if the echo arrives after the 'standard' time, starts measuring time at the 'standard' time and stops when the echo is detected. The difference between these time periods is converted internally to a thickness value and it displayed as a reading of the amount of offset from the standard piece.

It is of course necessary in the offset mode of operation to establish whether the reading from the workpiece under test is greater or less than the reading from the standard piece previously set. If the first return echo from the workpiece occurs before the internally generated standard echo time, then the workpiece is less thick than the standard piece and the reading is displayed as a negative value, as is the case with the example illustrated in FIG. 2.

Among the advantages of providing a push-button or manual switch adjustment of offset are the following. Although one should theoretically make calibration and zero blocks of approximately the same thickness as the workpiece to be measured, this practice is very often not followed. Thus, zeroing a probe on a zero block of a first thickness and then carrying out measurements on a workpiece of much greater thickness can give rise to non-linearity errors by virtue of the difference in thickness and the performance of the measuring instrument circuitry. By the provision of an instrument in accordance with the invention which can offset its measurements to a standard workpiece and make comparison measurements from this datum one avoids most of these non-linearity errors. Secondly, differential measurements achieved by the offset procedure enable one to achieve better resolution of thickness at the upper end of the instrument range. For example, a typical instrument might have inch ranges of 1.999" and 19.99". Unless some form of offset is applied, it is not possible to measure for example a 3 inch workpiece with a resolution better than 0.01 of an inch, whereas if an offset to a 3 inch standard is made, then comparison measurements can be made with a resolution of 0.001 of an inch. Thirdly, the offset mode can be of value when one wishes to provide an indication that the thickness of a workpiece under test lies outside a given range. Such out-of-range indications may be linked to warning systems such as lamps and bells. The circuitry required to provide such an indication will normally compare an actual reading which is taken with both an upper and a lower predetermined figure. For example, if a nominal 2 inch workpiece must lie within the range 1.95 to 2.05 inches, it is necessary to make sure that the actual reading obtained from the measurement is greater than 1.95 but less than 2.05. If the offset mode of measurement is used the instrument may be offset to 2 inches and the only test which it is then necessary to make is to ensure that the magnitude of the difference reading is less than 0.05 inches. This can be accomplished with much simpler circuitry than is the case with conventional comparison readings with upper and lower limits.

Figure 3:
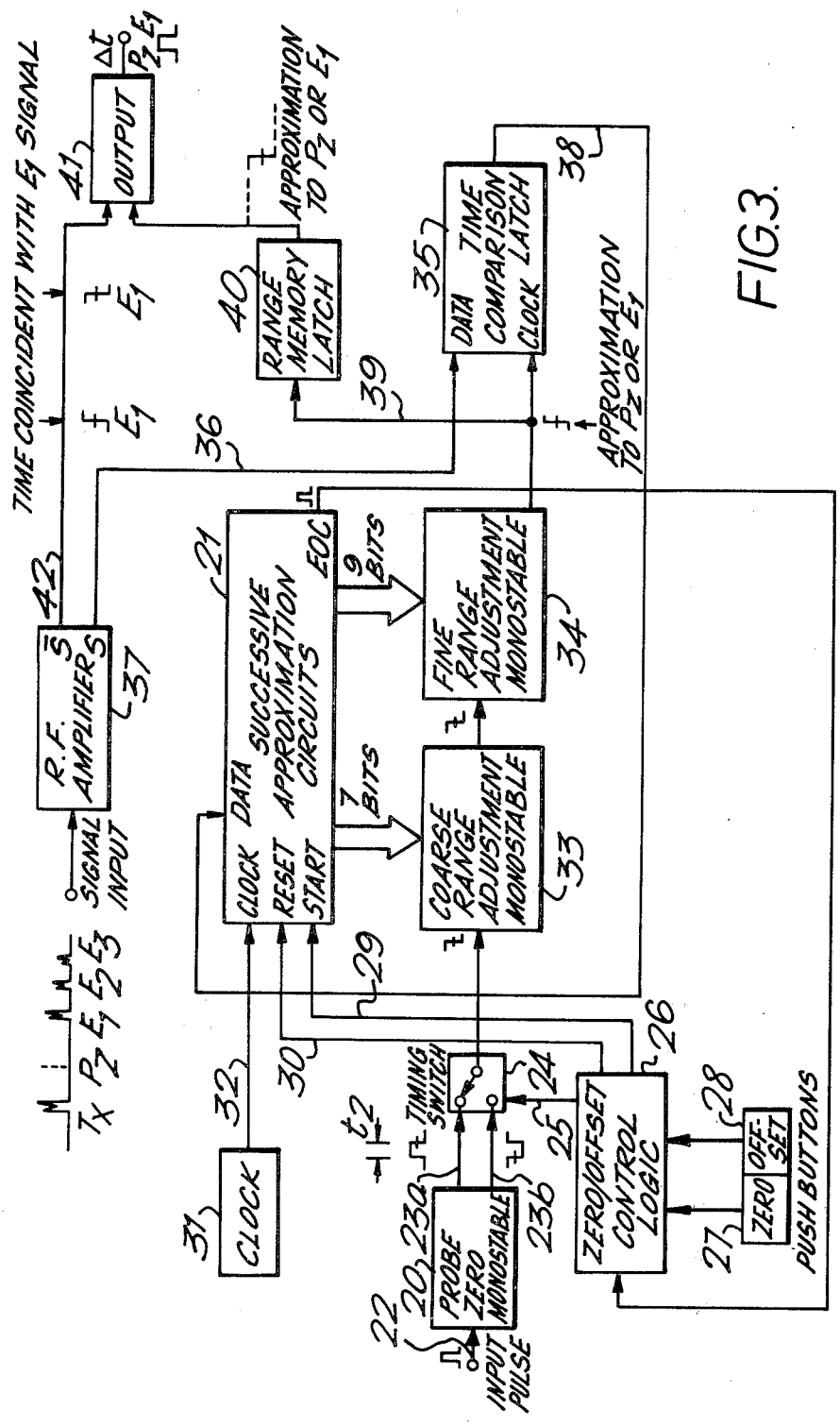

Reference is now made to FIG. 3 which shows one example of apparatus in accordance with the invention able to operate in both of the aforesaid modes. The timing circuitry is essentially based upon the provision of a probe zero monostable 20 and successive approximation circuits 21 which comprise a series of registers. The probe zero monostable 20 receives on its input line 22 an input pulse which is arranged to be coincident in time with the pulse $T_x$ applied to the transmitter crystal 11 of the probe (FIG. 1). The probe zero monostable 20 is preset as referred to above to a value equal to the ultrasonic transit time through the zero block or the standard block, whichever is being used. The pulse output from the monostable shown as a rectangular pulse, equal in length to the aforesaid transit time, is provided on two output lines 23a, 23b, so that the triggering of subsequent circuitry can be initiated by the rear or the front edge of the pulse respectively. At the output side of the monostable 20 is a two-position timing switch 24 which also receives an input on line 25 from a zero/offset control logic circuit 26. This control logic circuit 26 incorporates a zero push-button 27 and an offset push-button 28. Connection is made between the control logic circuit 26 and the start and reset terminals of the approximation circuits 21 on lines 29 and 30 respectively. The control logic circuit 26 is triggered by an end-of-conversion signal (EOC) from the approximation circuits 21. A clock 31 provides clock pulses on line 32 to the approximation circuits 21.

Associated with the approximation circuits 12 is a coarse range adjustment monostable 33, e.g. 1.5 to 108 $\mu$s, and a fine range adjustment monostable 34, e.g. 1.5 to 3 $\mu$s. The coarse range monostable 33 is controlled by seven bits from the approximation registers and the fine range monostable 34 is controlled by nine bits from the approximation registers. The output from the timing switch 24 is also fed through to the coarse range monostable 33. The output from the fine range adjustment monostable 34 is fed to the clock input of a time comparison latch circuit 35 which also receives a data input on line 36 from an RF amplifier 37 which amplifies the echo signals $E_1$, $E_2$, ... picked up by the probe and produces a digital output representative thereof. The output of the time comparison latch circuit 35 is fed back on line 38 to the data input of the approximation circuits 21.

The output from the fine range monostable 34 is also taken on line 39 to a range memory latch circuit 40 whose output (a time signal representing an approximation to the stand-off delay time $P_Z$ or to the first echo time $E_1$ depending upon whether one is operating in the zeroing or offset mode) is fed to an output circuit 41 which also receives an input on line 42 from the RF amplifier 37 in the form of a signal coincident in time with the first echo signal $E_1$. The range memory latch circuit 40 enables the aforesaid approximation time signal to be repeatedly fed to the instrument output 41 during the test procedure after the probe has been removed from the zero block or standard block as the case may be.

In operation, when the appropriate push-button 27 or 28 is depressed and then released the successive approximation circuits 21 begin their conversion. The time between the excitation of the piezoelectric transmitter crystal $T_X$ and the first return echo $E_1$ is approximated on the two monostable circuits 33, 34 controlled from the successive approximation registers 21. As the coarse range adjustment monostable 33 is controlled by seven bits and the fine range adjustment monostable 34 by a further nine bits, this enables the total time from $T_X$ to $E_1$, i.e. $t_1+t_2+t_3$, in FIG. 1, or $t_1'+t_2+t_3'$ in FIG. 2, to be electronically duplicated within the instrument to a sixteen bit approximation. A time change represented by the least significant bit of the fine range monostable 34 is about 3 nanoseconds, corresponding to a distance resolution of about 0.01 mm in steel.

Each of the sixteen bits is adjusted in sequence and the total time produced by the preset probe zero monostable 20 and by the coarse and fine range monostables 33 and 34 is compared in the time comparison latch circuit 35 with the arrival time of the digital waveform from the RF amplifier 37 which occurs coincident with the echo waveform $E_1$. The time comparison latch circuit 35 makes a decision based upon this comparison and provides an output on line 38 which is fed back as data to the approximation circuits 21 so that the approximation circuits can decide whether the bit under test should be retained or removed. The data on line 38 depends upon the value of the data input to the circuit 35 when the fine range monostable 34 resets.

If the zero adjustment push-button 27 was initially selected, the zero/offset control logic 26 changes the triggering of the coarse range monostable 33 from the rear edge to the front edge of the pulse from the preset probe zero monostable 20 by means of the two-way timing switch 24 upon receipt of an end-of-conversion signal (EOC) from the approximation circuits 21. In other words the delay introduced by the probe zero monostable is removed and the monostable 20 is in effect by-passed. If on the other hand the offset push-button 28 was initially selected, then the timing switch 24 remains unaltered at the end of the approximation procedure, the coarse range monostable 33 continues to be triggered from the rear edge of the pulse from the probe zero monostable, and the stand-off delay time remains in circuit.

Although the description given above is in relation to an instrument which can operate in both a zero mode and an offset mode, the invention is not to be considered as being limited to a method or apparatus which is capable of both these functions. In certain cases it may not be necessary to provide the capacity for both modes of operation, and the invention is therefore to be understood as including a method and apparatus operable in the zero and/or offset modes.

Furthermore, although reference has been made above to push-buttons for controlling the operational procedure, this is intended also to include simple two-position or three-position switches, e.g. toggle switches, and the like, which are easily operated manually on an instrument panel.

I claim:

1. A method of measuring the thickness of a test piece using an ultrasonic probe comprising ultrasonic pulse transmitting and receiving means mounted on an acoustic stand-off, the method comprising placing the probe on a block which has a determined pulse transit time, duplicating said transit time as a first time-value signal, detecting the first return echo received by the pulse receiving means from the remote face of the block, setting up a storable second time-value signal representative of the time period from the transmission of a pulse by said pulse transmitting means to the receipt of the first such return echo arising from said pulse by automatically approximating the position in time of the first return echo, and using said first time-value signal and a recalled duplicate of said second time-value signal under the control of manual control means to adjust the probe output values for the acoustic delay time of the stand-off material.

2. A method as claimed in claim 1, in which the first time-value signal is subtracted from the second time-value signal upon operation of the manual control means to adjust the probe output values for the acoustic 3. A method as claimed in claim 1, in which said second time-value signal is obtained by making successive approximations of the position in time of said first return echo.

4. A method as claimed in claim 3, in which echo signals received by the receiving means are converted to digital form, and in which the time period represented by the second time-value signal is compared with the arrival time of the digital signal representing said first return echo, any difference being fed back for the making of a further adjustment to said approximated second time-value signal.

5. A method of measuring the thickness of a test piece using an ultrasonic probe comprising ultrasonic pulse transmitting and receiving means mounted on an acoustic stand-off, the method comprising placing the probe on a block which has a determined pulse transit time, duplicating said transit time as a first time-value signal, detecting the first return echo received by the pulse receiving means from the remote face of the block, setting up a storable second time-value signal representative of the time period from the transmission of a pulse by said pulse transmitting means to the receipt of the first such return echo arising from said pulse by automatically approximating the position in time of the first return echo, and using said first time-value signal and a recalled duplicate of said second time-value signal under the control of manual control means to adjust the probe output values to an offset value which is displaced from a zero datum and which is dependent on the transit time of the block.

6. A method as claimed in claim 5, in which the block is a standard block of known thickness relative to which offset value the probe output values are to be related, and in which a differential measurement is carried out by comparing said second time-value signal obtained from the standard block with the second time-value signal obtained from a test piece of unknown thickness.

7. Apparatus for measuring the thickness of materials comprising an ultrasonic probe comprising ultrasonic pulse transmitting and receiving means mounted on an acoustic stand-off, presettable means to duplicate the transit time of such pulses through a block on which the probe may be placed and to produce a first time-value signal representative thereof, means automatically to generate a second time-value signal representative of the time period from the transmission of a pulse by said pulse transmitting means to the receipt of the first return echo from the remote face of said block, said generating means comprising approximation means which make an approximation of the position in time of the first return echo, and manual control means operative to use said first time-value signal and a recalled duplicate of said second time-value signal to adjust the probe output values for the acoustic delay time of the stand-off material.

8. Apparatus as claimed in claim 7, in which said manual control means comprises a switch, operation of which zeroes the probe for the acoustic delay time of the stand-off material.

9. Apparatus as claimed in claim 8, which includes control means connected to said manual switch and operative to control a further switch which is operative effectively to by-pass said presettable means when said manual switch is actuated.

10. Apparatus as claimed in claim 7, in which said presettable means comprises a monostable circuit.

11. Apparatus as claimed in claim 7, in which said approximation means make successive approximations of the position in time of said first return echo, and comparison means comprising the approximated second time-value signal with the arrival time of a signal representative of said first return echo and feeding any difference signal back to said approximation means.

12. Apparatus as claimed in claim 11, in which the approximation means control the setting of monostable circuit means whose output is representative of the second time-value signal.

13. Apparatus as claimed in claim 11, in which the signal received by the comparison means representative of said first return echo is a digital signal.

14. Apparatus as claimed in claim 12, in which said monostable circuit means comprises a coarse range monostable controlled by a first plurality of bits from successive approximation registers and a fine range monostable controlled by a second plurality of bits from said successive approximation registers, the coarse range monostable being triggered by said presettable means.

15. Apparatus for measuring the thickness of materials comprising an ultrasonic probe comprising ultrasonic pulse transmitting and receiving means mounted on an acoustic stand-off presettable means to duplicate the transit time of such pulses through a block on which the probe may be placed and to provide a first time-value signal representative thereof, means automatically to generate a second time-value signal representative of the time period from the transmission of a pulse by said pulse transmitting means to the receipt of the first return echo from the remote face of said block, said generating means comprising approximation means which make an approximation of the position in time of the first return echo, and manual control means operative to use said first time-value signal and a recalled duplicate of the second time-value signal to adjust the probe output values to an offset value which is displaced from a zero datum and which is dependent on the transit time of the block.

16. Apparatus as claimed in claim 15, in which said manual control means comprises a switch, operation of which offsets the probe output values.

* * * * *

UNITED STATES PATENT AND TRADEMARK OFFICE
CERTIFICATE OF CORRECTION

PATENT NO. : 4,324,141
DATED : April 13, 1982
INVENTOR(S) : Richard John STEARN

It is certified that error appears in the above—identified patent and that said Letters Patent is hereby corrected as shown below:

At the end of Claim 2, insert the following:

--delay time of the stand-off material.--

Signed and Sealed this

Thirty-first Day of August 1982

[SEAL]

Attest:

GERALD J. MOSSINGHOFF

Attesting Officer     Commissioner of Patents and Trademarks